(12) United States Patent
Haecker et al.

(10) Patent No.: US 8,656,960 B2
(45) Date of Patent: Feb. 25, 2014

(54) HYDRAULICALLY CONTROLLED ACCUMULATOR-CHAMBER VALVE

(71) Applicant: Robert Bosch GmbH, Stuttgart (DE)

(72) Inventors: Juergen Haecker, Schwieberdingen (DE); Daniel Gosse, Berlin (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/720,416

(22) Filed: Dec. 19, 2012

(65) Prior Publication Data

US 2013/0160883 A1 Jun. 27, 2013

(30) Foreign Application Priority Data

Dec. 27, 2011 (DE) .......................... 10 2011 089 951

(51) Int. Cl.
*F16L 55/04* (2006.01)

(52) U.S. Cl.
USPC ............. 138/31; 138/30; 303/115.4; 251/339

(58) Field of Classification Search
USPC .......... 138/31, 30; 251/339; 303/115.4, 119.2
See application file for complete search history.

(56) References Cited

U.S. PATENT DOCUMENTS

| | | | | |
|---|---|---|---|---|
| 4,014,213 | A * | 3/1977 | Parquet ...................... | 73/290 R |
| 6,189,572 | B1 * | 2/2001 | Ruffer et al. .................... | 138/30 |
| 6,322,338 | B1 * | 11/2001 | Nishio ........................... | 417/540 |
| 6,478,051 | B1 * | 11/2002 | Drumm et al. .................. | 138/30 |
| 6,634,386 | B1 * | 10/2003 | Maloney et al. ................ | 138/31 |
| 6,845,793 | B2 * | 1/2005 | Ruffer et al. ..................... | 141/7 |
| 7,543,896 | B2 | 6/2009 | Ariki et al. | |

FOREIGN PATENT DOCUMENTS

DE 42 02 388 A1 8/1993

* cited by examiner

*Primary Examiner* — Patrick F Brinson
(74) *Attorney, Agent, or Firm* — Maginot, Moore & Beck

(57) ABSTRACT

A hydraulically controlled accumulator-chamber valve has a closing element and a tappet. The closing element is prestressed via a first compression spring and seals a valve seat in a valve body. The tappet reaches through a leadthrough in the valve body and is moved by an accumulator piston. The accumulator piston is loaded by a second compression spring. The tappet is moved to press the closing element out of the valve seat when there is a specified balance of forces between the spring prestressing forces and a hydraulically active force. The closing element and the tappet are configured as a single-piece component, in order to guide the tappet in the leadthrough in a longitudinally movable manner. The tappet bears against an end face of the accumulator piston during an opening movement.

10 Claims, 3 Drawing Sheets

HYDRAULICALLY CONTROLLED ACCUMULATOR-CHAMBER VALVE

This application claims priority under 35 U.S.C. §119 to patent application no. DE 10 2011 089 951.0, filed on Dec. 27, 2011 in Germany, the disclosure of which is incorporated herein by reference in its entirety.

BACKGROUND

The disclosure proceeds from a hydraulically controlled accumulator-chamber valve according to the description below.

Patent specification U.S. Pat. No. 7,543,896 B2, for example, has disclosed a hydraulically controlled accumulator-chamber valve, in which, in the accumulator piston, a ball seat valve which is prestressed by spring is opened via a tappet. This takes place in the case of a balance of forces specified for the system between a spring prestressing force and a hydraulically active force. The actuation of the ball seat valve takes place via a cylindrical metallic tappet which is pressed into the accumulator piston. The accumulator piston also accommodates a sealing ring and a guide ring. A correspondingly prestressed compression spring is situated between the accumulator piston and the closure cover which is connected to the pump housing via a securing calked portion. The spring force acts counter to the hydraulically active force on the accumulator piston and, in the case of a surplus of the spring force, brings about a displacement of the accumulator piston/tappet combination in the opening direction of the accumulator-chamber valve. Here, the ball is moved out of the seat by the tappet and the accumulator-chamber valve is opened.

Laid-open specification DE 42 02 388 A1 describes, for example, a hydraulic brake system for a motor vehicle. The brake system which is described comprises a hydraulically controlled accumulator-chamber valve with a closing element which is prestressed via a first compression spring and seals a valve seat in a valve body, and with a tappet which is connected to an accumulator piston, which is loaded by a second compression spring, and presses the closing element out of the valve seat when there is a specified balance of forces between the spring prestressing forces and a hydraulically active force. In these constructions of accumulator-chamber valves, the sealing body of the valve which is closed in a spring-assisted manner is moved into the open position by a pin which is connected to the accumulator piston, as soon as the accumulator-chamber volume undershoots a threshold value, that is to say the accumulator piston approaches the stop.

SUMMARY

In contrast, the hydraulically controlled accumulator-chamber valve according to the disclosure having the features of the below description has the advantage that the production capability of the individual parts can be simplified and the production costs can be lowered. Embodiments of the present disclosure make it possible to reduce the accuracy requirements during manufacture, assembly and construction of the accumulator-chamber valve, with the result that the complexity and production costs can be reduced further and the functional robustness can be increased. In addition, embodiments of the present disclosure provide a further degree of freedom in the configuration of the accumulator-chamber valve, by an eccentric arrangement of the valve body with valve seat and of the closing element with tappet being made possible.

The core concept of the disclosure consists in the fastening of the tappet not to the accumulator piston, but rather to the closing element, and in the associated single-piece configuration of the closing element with the tappet, the tappet first of all performing a lateral tilting movement and then a guided linear movement which is actuated by way of a pressure contact of the approaching accumulator piston.

The closing element and the tappet can preferably be configured as a single-piece plastic element. Other suitable materials, such as metals, can also be used to produce the single-piece component.

Embodiments of the present disclosure provide a hydraulically controlled accumulator-chamber valve which comprises a closing element which is prestressed via a first compression spring and seals a valve seat in a valve body, and a tappet which reaches through a leadthrough in the valve body and can be moved by an accumulator piston which is loaded by a second compression spring, in order to press the closing element out of the valve seat when there is a specified balance of forces between the spring prestressing forces and a hydraulically active force. This means that the spring force of the second compression spring which acts on the accumulator piston is greater than the hydraulic force which acts on the accumulator piston and the prestressing force of the first compression spring which acts on the closing element. According to the disclosure, the closing element and the tappet are configured as a single-piece component, in order to guide the tappet in the leadthrough in a longitudinally movable manner, the tappet bearing against an end face of the accumulator piston during the opening movement and first of all performing a lateral tilting movement and then a guided linear movement. As a result of the single-piece configuration, the number of components and therefore the component costs and the number of assembly steps can advantageously be reduced. In addition, the result is a greater flexibility with regard to the arrangement and the configuration of the receiving bores for the control piston and the control valve in a fluid block or pump housing.

A further advantage of the disclosure is that a slightly modified accumulator piston of conventional accumulators can be used, with the result that complexity and costs for a special piston with attached single-piece and/or multiple-piece tappet and/or further special measures, such as guide rings, guidance length, seals, etc., for a particularly precise linear movement of the accumulator piston can be omitted, in order to introduce the tappet reliably and robustly via tolerance and operating positions into the valve body bore. In addition, embodiments of the present disclosure also make a central or eccentric arrangement of the accumulator-chamber valve possible, since the function is ensured independently of where the accumulator piston comes into contact by way of its end face with the tappet.

Advantageous improvements of the hydraulically controlled accumulator-chamber valve which is specified in the below description are possible by way of the measures and developments which are described further below.

It is particularly advantageous that the closing element can be configured as a cup with an inner bore, in which the first compression spring is guided, and in the direction of the cup opening with an outer contour which is formed as a guide face and, in the tilted state of the closing element, bears against a wall of a receiving bore in the valve body, which receiving bore guides the closing element. The guide face of the closing element which is configured as a cup can preferably be configured in such a way that it bears in parallel against the wall of the receiving bore in the case of an optimum tilting angle and is therefore guided over the entire length during the linear opening movement. A stop can advantageously be formed at the lower edge of the leadthrough in the valve body in order to limit the tilting movement of the tappet. A compensation for the assembly tolerances is advantageously possible over the tilting angle range. In addition, jamming of the closing element can advantageously be prevented by the stop and the limiting of the tilting movement. The tilting movement and the stop can be defined, for example, via corresponding dimensioning of length and diameter of the leadthrough in the valve body and of the tappet and via the length of the guide face. In addition, the closing element can have lateral openings which improve the fluid flow as a remedy to the constriction of the flow cross section, which constriction arises as a result of the tilting of the closing element with the tappet. As an alternative, in order to improve the fluid flow, at least one groove can be made in the guide face of the closing element or in the wall of the receiving bore of the valve body.

In an advantageous refinement of the hydraulically controlled accumulator-chamber valve according to the disclosure, on its end face, the accumulator piston can have actuating means for actuating the tilting movement of the tappet. This means that the end face of the accumulator piston can be configured to not be flat, but rather with a circumferential elevation which has a run-on contour for actuating the tilting movement of the tappet. The run-on contour for actuating the tilting movement of the tappet can be configured, for example, as a ramp with a predefined inclination or as a bulge with a predefined curved or round contour or as a combination of ramp and bulge.

In a further advantageous refinement of the hydraulically controlled accumulator-chamber valve according to the disclosure, the tappet can be configured with a tilting geometry which interacts with the run-on contour of the circumferential elevation and generates a tilting moment for the tappet. As a result, the force which is required to open the valve can be reduced via a type of step-up transmission ratio. Since the active hydraulic force on the closing element is not to be disregarded, the tilting moment facilitates the opening movement, since a pressure equalization which has an advantageous effect on the opening movement takes place as a result of the opening gap which is produced. In order to generate the tilting moment for the tappet, the tilting geometry of the tappet has, for example, a peak which is adapted to the inclination of the ramp of the circumferential elevation. In addition or as an alternative, the tilting geometry for generating the tilting moment can have a curved or round contour which is adapted to the bulge of the circumferential elevation. In order to initiate the tilting element, the tilting geometry of the tappet rolls or revolves on the run-on contour of the piston or slides over the inclination.

One exemplary embodiment of the disclosure is shown in the drawings and will be explained in greater detail in the following description. In the drawings, identical reference numerals denote components or elements which perform identical or analogous functions.

DETAILED DESCRIPTION

A separate tappet which is connected fixedly to the accumulator piston and presses against the valve closing element is known from the prior art. Since, inherently to the functional principle, a certain play is required between the accumulator piston and the housing, the contact of the tappet with the closing element has to be ensured by high requirements placed on the component tolerances. Since the lever arm of the tappet is relatively great in relation to the pivot point of the control piston and a rotation of the control piston about its vertical axis (stroke direction) is possible, the tappet and the accumulator-chamber valve are arranged centrally in the control piston and in the accumulator-chamber bore. Since the tappet is connected fixedly to the accumulator piston and has to dip through the valve body opening, in order to move the sealing body into the open position, a great precision of part geometry and stroke movement is required in the case of the accumulator piston and the tappet. This precision of the parts is usually achieved by highly accurate production and assembly, that is to say expensive parts. The precision of the accumulator piston stroke movement is achieved by a more complicated construction, such as with additional guide rings, great guidance length, etc.

Figure 1:
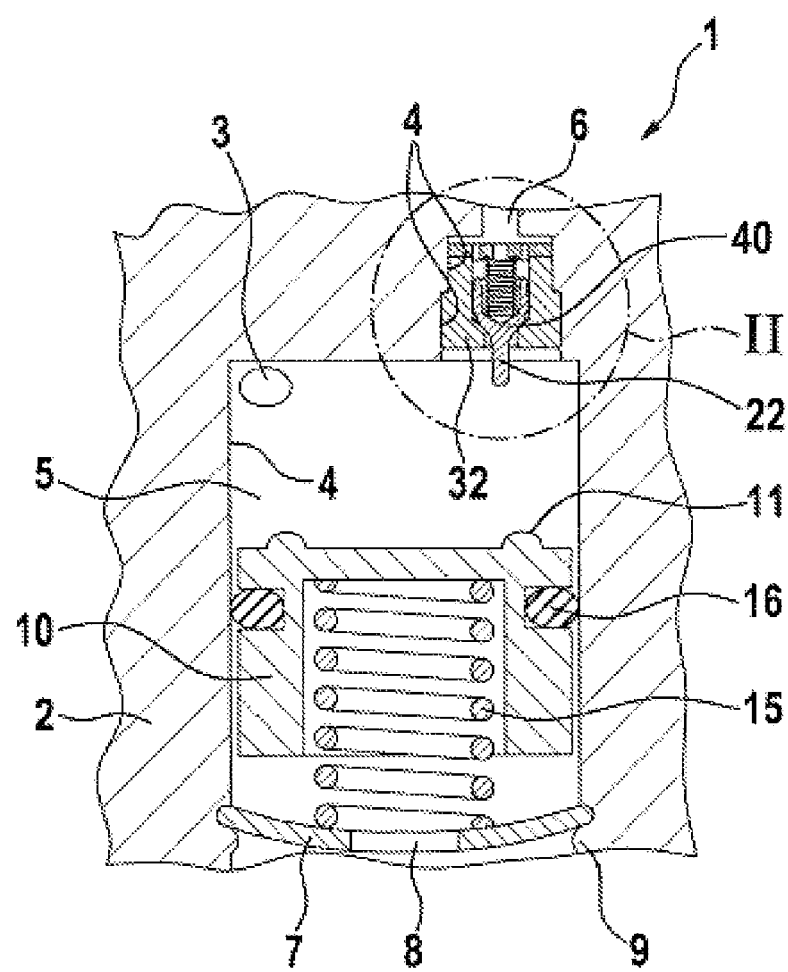
FIG. 1 shows a diagrammatic longitudinal sectional illustration of a valve arrangement with one exemplary embodiment of an accumulator-chamber valve according to the disclosure.

FIG. 1 shows a valve arrangement having a hydraulically controlled accumulator-chamber valve 1 according to the disclosure which is arranged in a stepped receiving bore 4 of a fluid block 2 or pump housing. Embodiments of the hydraulically controlled accumulator-chamber valve 1 according to the disclosure can be used, for example, in a hydraulic brake system in a vehicle.

Figure 2:
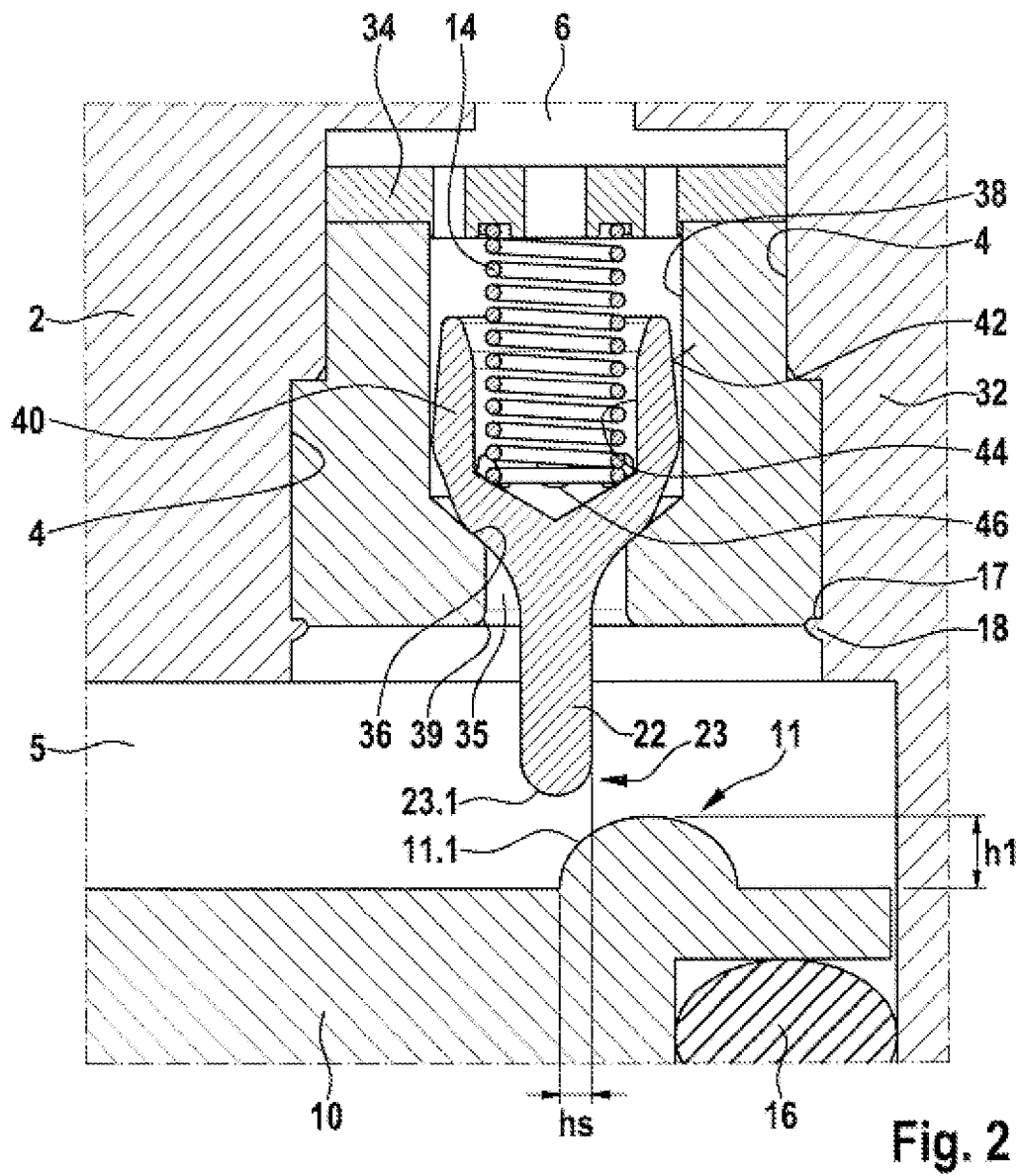
FIG. 2 shows a diagrammatic detailed sectional illustration of the valve arrangement from FIG. 1 with a closed accumulator-chamber valve.
Figure 3:
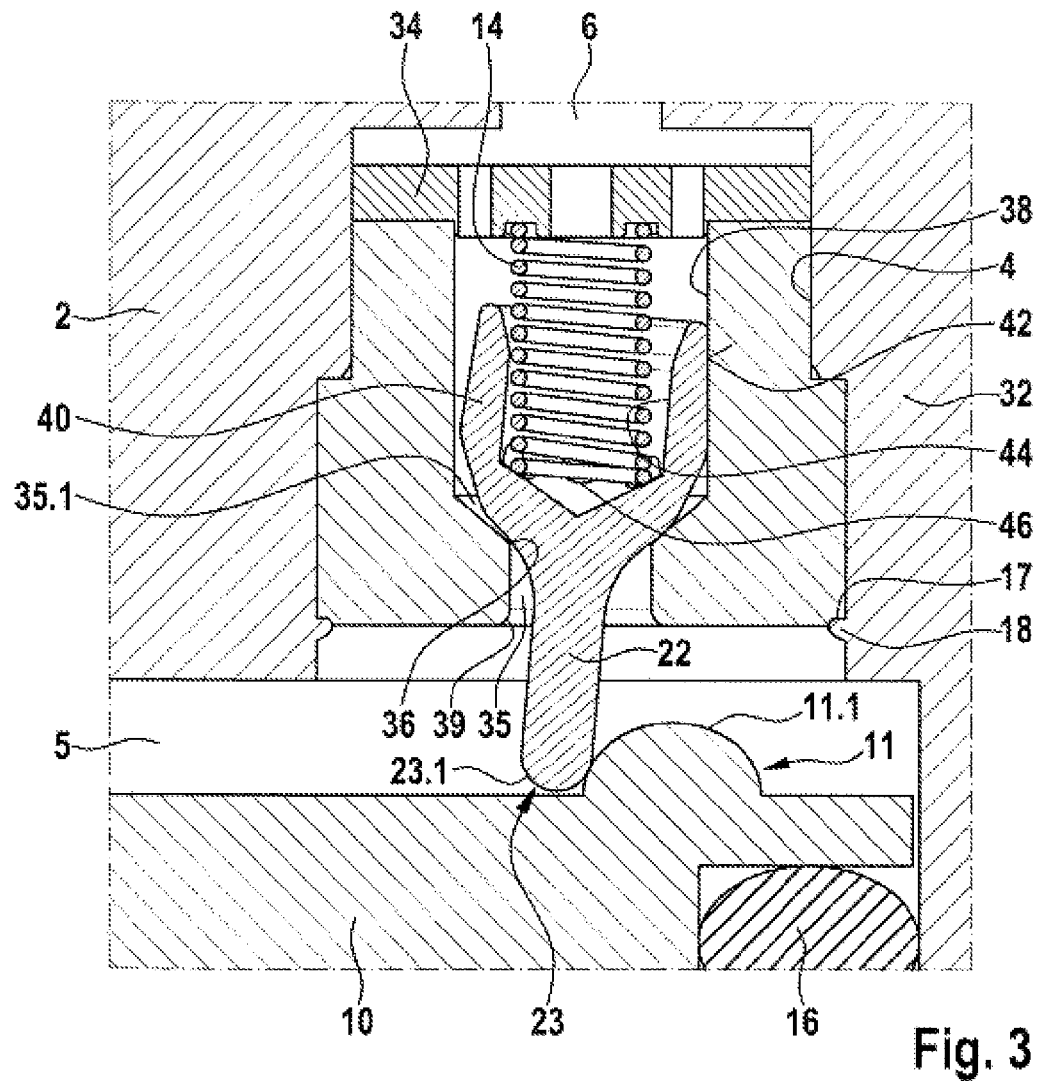
FIG. 3 shows a diagrammatic detailed sectional illustration of the valve arrangement from FIG. 1 with a partially open accumulator-chamber valve.

As can be seen further from FIGS. 1 to 3, the exemplary embodiment which is shown of the hydraulically controlled accumulator-chamber valve 1 comprises a closing element 40, which is prestressed via a first compression spring 14, and a tappet 22. Here, the closing element 40 seals a valve seat 36 in a valve body 32. The tappet 22 reaches through a leadthrough 35 in the valve body 32, at the upper edge of which the valve seat 36 and at the lower edge of which a stop 39 for a tilting movement of the tappet 22 are formed, and is moved by an accumulator piston 10 which is loaded by a second compression spring 15, in order first of all to tilt the closing element 40 and then to press it out of the valve seat 36 when there is a specified balance of forces between the spring prestressing forces and a hydraulically active force. In the exemplary embodiments which are shown, this is the case when the spring force of the second compression spring 15 which acts on the accumulator piston 10 is greater than the hydraulic force which acts on the accumulator piston 10 and the prestressing force of the first compression spring 14 which acts on the closing element 40. If the spring force of the second compression spring 15 which acts on the accumulator piston 10 is smaller than the hydraulic force which acts on the accumulator piston 10 and the prestressing force of the first compression spring 14 which acts on the closing element 40, the closing element 40 is pressed into the valve seat 36.

According to the disclosure, the closing element 40 and the tappet 22 are configured as a single-piece component, in order to guide the tappet 22 in the leadthrough 35 in a longitudinally movable manner, the tappet 22 bearing against an end face of the accumulator piston 10 during the opening movement and first of all performing a lateral tilting movement and then a guided linear movement. This makes it possible in an advantageous way to reduce the accuracy requirements made of production, assembly and construction of the hydraulically controlled accumulator-chamber valve 1, with the result that complexity and production costs can be reduced and the functional robustness can be increased.

As can be seen from FIG. 1, in the exemplary embodiment which is shown of the hydraulically controlled accumulator-chamber valve 1 according to the disclosure, the valve body 32 with the valve seat 36 and the closing element 40 with the tappet 22 are arranged eccentrically at the right-hand edge of a receiving bore 4 which forms an accumulator chamber 5. The core concept of the exemplary embodiment which is shown is the configuration of the closing element 40 and the tappet 22 as a single-piece component which is preferably configured as a plastic component, in order to guide the tappet 22 in the leadthrough 35 and the actuation of the tappet 22 by pressure contact of the approaching accumulator piston 10. In the exemplary embodiment which is shown of the hydraulically controlled accumulator-chamber valve 1 according to the disclosure, the tappet 22 is therefore not connected to the accumulator piston 10.

As can be seen from FIGS. 1 to 3, in the exemplary embodiment which is shown, the closing element 40 is configured as a cup with an inner bore 44, in which the first compression spring 14 is guided. In the direction of the cup opening, the closing element 40 which is configured as a cup has an outer contour which is formed as a guide face 42 and, in the tilted state (shown in FIG. 3) of the closing element 40, bears against a wall of a receiving bore 38 in the valve body 32, which receiving bore 38 guides the closing element 40. The guide face 42 is adjoined at the bottom by the closing geometry which is configured as a ball segment and with which the closing element 40 seals in the closed state in the valve seat 36. The closing geometry merges into the tappet 22 which can have various shapes. The formation of the closing element/tappet combination as a PPS or PEEK plastic part is particularly advantageous. Other suitable materials or material combinations can also be used to form the closing element/tappet combination.

In the exemplary embodiment which is shown, the cross-sectional area of the tappet 22 is substantially smaller than the cross-sectional area of the leadthrough 35 in the valve body 32, at the edge of which leadthrough 35 the valve seat 36 is formed. As can be seen further from FIG. 3, the guide face 32 of the closing element 40 which is configured as a cup bears in parallel against the wall of the receiving bore 38 in the case of the optimum tilting angle which is shown, and is guided over the entire length during the following linear movement. A stop 39 for limiting the tilting movement of the tappet 22 is formed at the lower edge of the leadthrough 35 in the valve body 32.

As can be seen further from FIGS. 1 to 3, the tappet 22 can have a tilting geometry 23 in the form of a peak or rounded portion. In the exemplary embodiment which is shown, the tilting geometry 23 is configured as a rounded portion 23.1 which lies opposite a counterpart in the form of a concentrically circumferential elevation 11 with a bulge 11.1 on the end face of the accumulator piston 10. When the accumulator piston 10 comes into contact with the tappet 22 with closing body 40, the tappet 22 experiences a tilting moment in a predefined tilting region hs with a height h1, before the axial or linear deflection, as a result of the rounded portion 23.1 which is adapted to the bulge 11.1 of the elevation 11 and is configured, for example, as a ball segment. As a result, a force which is required for opening or raising the closing body 40 can be reduced via a type of transmission ratio. Since the active hydraulic force on the closing element 40 is not to be disregarded, the tilting moment facilitates the opening movement, since a pressure equalization which has an advantageous effect on the opening movement takes place as a result of the crescent-shaped opening gap 35.1 which is produced.

As can be seen further from FIGS. 1 to 3, the valve body 32 is fastened by being pressed or calked or screwed into the receiving bore 4 in the fluid block 2. In the exemplary embodiment which is shown, the valve body 32 is pressed and calked into the receiving bore 4 in the fluid block 2. For receiving and guiding the closing element 40, the valve body 32 has a receiving bore 38 which is adjoined by the leadthrough 35. The valve seat 36 is arranged at the transition between the receiving bore 38 and the leadthrough 35. As has already been mentioned above, a lower edge of the leadthrough 35 acts as a stop 39 for limiting the tilting movement of the tappet 22, a crescent-shaped opening gap 35.1 being produced by the rolling or revolving of the tilting geometry 23 of the tappet which is configured, for example, as a ball segment 23.1 on the run-on contour 11 of the accumulator piston 10 which is configured as a bulge 11.1, which opening gap 35.1 brings about a pressure equalization, as a result of which the further opening movement and the pressing of the closing element 40 out of the valve seat 36 are facilitated.

As can be seen from FIGS. 2 and 3, the closing element 40 which is configured as a cup has lateral openings 46 below the lateral guide face 42, in order to facilitate the fluid through-flow despite constriction of the flow cross section on account of the tilted tappet 22. In addition or as an alternative, at least one groove can be made in the guide face 42 or in the wall of the receiving bore 38 of the valve body 32, in order to improve the fluid flow.

As can be seen further from FIGS. 1 to 3, the valve body 32 of the hydraulically controlled accumulator-chamber valve 1 according to the disclosure is mounted into the fluid block 2 or into the pump housing via a calking region 17 and is fixed positionally via a first holding calked portion 18. In order to produce the first holding calked portion 18 with the corresponding calking region 17, material of the fluid assembly 2 or of the pump housing is deformed plastically by way of a suitable calking tool, with the result that a preferably circumferential web is formed which covers the calking region 17 at least partially.

The actuation of the accumulator-chamber valve 1 takes place by way of the axial displacement of the accumulator piston 10 and the actuation of the closing element 40 takes place via tilting of the tappet 22 with subsequent axial or linear displacement of the tappet 22, in order to press the closing element 40 out of the valve seat 36. The accumulator piston 10 is sealed and guided via at least one sealing ring 16 in the stepped receiving bore 4 in the fluid block 2 or pump housing. The second prestressed compression spring 15 is arranged between the accumulator piston 10 and a closure cover 7 which is connected via a further holding calked portion 9 to the fluid block 2 or pump housing. In order to produce the further holding calked portion 9 with the closure cover 7, material of the fluid assembly 2 or of the pump housing is deformed plastically by way of a suitable calking tool, with the result that a preferably circumferential web is formed which covers the edge of the closure cover 7 at least partially. In addition, the underside of the accumulator piston 10 is connected to atmospheric pressure via an opening 8 in the closure cover 7. An accumulator chamber 5 of the accumulator-chamber valve 1 is formed between the upper side of the accumulator piston 10 and the valve body 32. The accumulator-chamber valve 1 is open in the pressureless state. This takes place via a displacement of the accumulator piston 10 into an upper end position, caused by the prestressed second compression spring 15 which acts on the underside of the accumulator piston 10. The connection to atmosphere is not necessarily required for the present disclosure. Alternative embodiments (not shown) of the present disclosure can have a closed spring space for the second compression spring 15, with the result that an immersible sealing action can also be advantageously realized.

During the operation of the hydraulic system, preferably of the hydraulic brake system for a motor vehicle, the spring force of the second compression spring 15 acts counter to the spring force of the first compression spring 14 and the hydraulically active force on the accumulator piston 10. Here, a surplus of the hydraulic force brings about a displacement of the closing element 40 via the tappet 22 in the closing direction of the accumulator-chamber valve 1. Here, the closing element 40 is pressed into the valve seat 36 by the spring force of the first compression spring 14. A surplus of the spring force of the second compression spring 15 brings about a displacement of the tappet/closing element combination in the opening direction of the accumulator-chamber valve 1. Here, the closing element 40 is moved out of the valve seat 36 by the tappet 22 and the accumulator-chamber valve 1 is opened. In the open state, the fluid can flow in a virtually unimpeded manner from a first fluid connection 6, which is connected, for example, to a brake master cylinder, via corresponding openings in a cover 34, which is pressed and calked, for example, into the receiving bore 38 of the valve body 32, and the open valve seat 36 to a fluid connection 3, which opens into the accumulator chamber 5 and is connected, for example, to a recirculating pump. Here, a vacuum which is generated by the recirculating pump and acts on the end face of the piston 10 assists the opening of the accumulator-chamber valve 1.

Embodiments of the present disclosure provide an accumulator-chamber valve, the individual parts of which can advantageously be produced in a simplified manner, with the result that the production costs can be reduced. Furthermore, embodiments of the present disclosure make it possible to reduce the accuracy requirements for production, assembly and construction of the accumulator-chamber valve, with the result that complexity and production costs can be reduced further and the functional robustness can be increased.

What is claimed is:

1. A hydraulically controlled accumulator-chamber valve comprising:
    a closing element which is prestressed via a first compression spring and seals a valve seat in a valve body;
    an accumulator piston which is loaded by a second compression spring; and
    a tappet configured to extend through a leadthrough in the valve body and to move via the accumulator piston to press the closing element out of the valve seat when there is a predetermined balance of forces between spring prestressing forces of the first compression spring and the second compression spring and a hydraulically active force, wherein:
    the closing element and the tappet are a single-piece component configured to guide the tappet in the leadthrough in a longitudinally movable manner, and
    the tappet is configured to bear against an end face of the accumulator piston during an opening movement and to perform a lateral tilting movement and a guided linear movement.

2. The accumulator-chamber valve according to claim 1, wherein:
    the closing element is a cup including:
        an inner bore, in which the first compression spring is guided, and
        an outer contour which is formed in the direction of the cup opening as a guide face,
    the valve body includes a receiving bore having a wall and configured to guide the closing element, and
    in a tilted state, the closing element bears against the wall of the receiving bore in the valve body.

3. The accumulator-chamber valve according to claim 2, wherein the guide face of the closing element bears in parallel against the wall of the receiving bore when at an optimum tilting angle.

4. The accumulator-chamber valve according to claim 1, wherein the leadthrough of the valve body includes a lower edge having a stop configured to limit the tilting movement of the tappet.

5. The accumulator-chamber valve according to claim 1, wherein the accumulator piston has an actuating mechanism on the end face configured to actuate the lateral tilting movement of the tappet.

6. The accumulator-chamber valve according to claim 5, wherein the accumulator piston has a circumferential elevation with a run-on contour configured to actuate the lateral tilting movement of the tappet.

7. The accumulator-chamber valve according to claim 6, wherein the run-on contour is at least one of a ramp with a predefined inclination and a bulge with a predefined curved or round contour.

8. The accumulator-chamber valve according to claim 6, wherein the tappet has a tilting geometry configured to interact with the run-on contour of the circumferential elevation to generate a tilting moment for the tappet.

9. The accumulator-chamber valve according to claim 8, wherein the tilting geometry of the tappet has at least one of a peak which is adapted to the predetermined inclination of the ramp of the circumferential elevation and a curved or round contour which is adapted to the bulge of the circumferential elevation.

10. The accumulator-chamber valve according to claim 1, further comprising a receiving bore which forms an accumulator chamber, wherein the valve body is arranged with the valve seat and the tappet centrally or eccentrically in the receiving bore.

* * * * *